Figure 1:
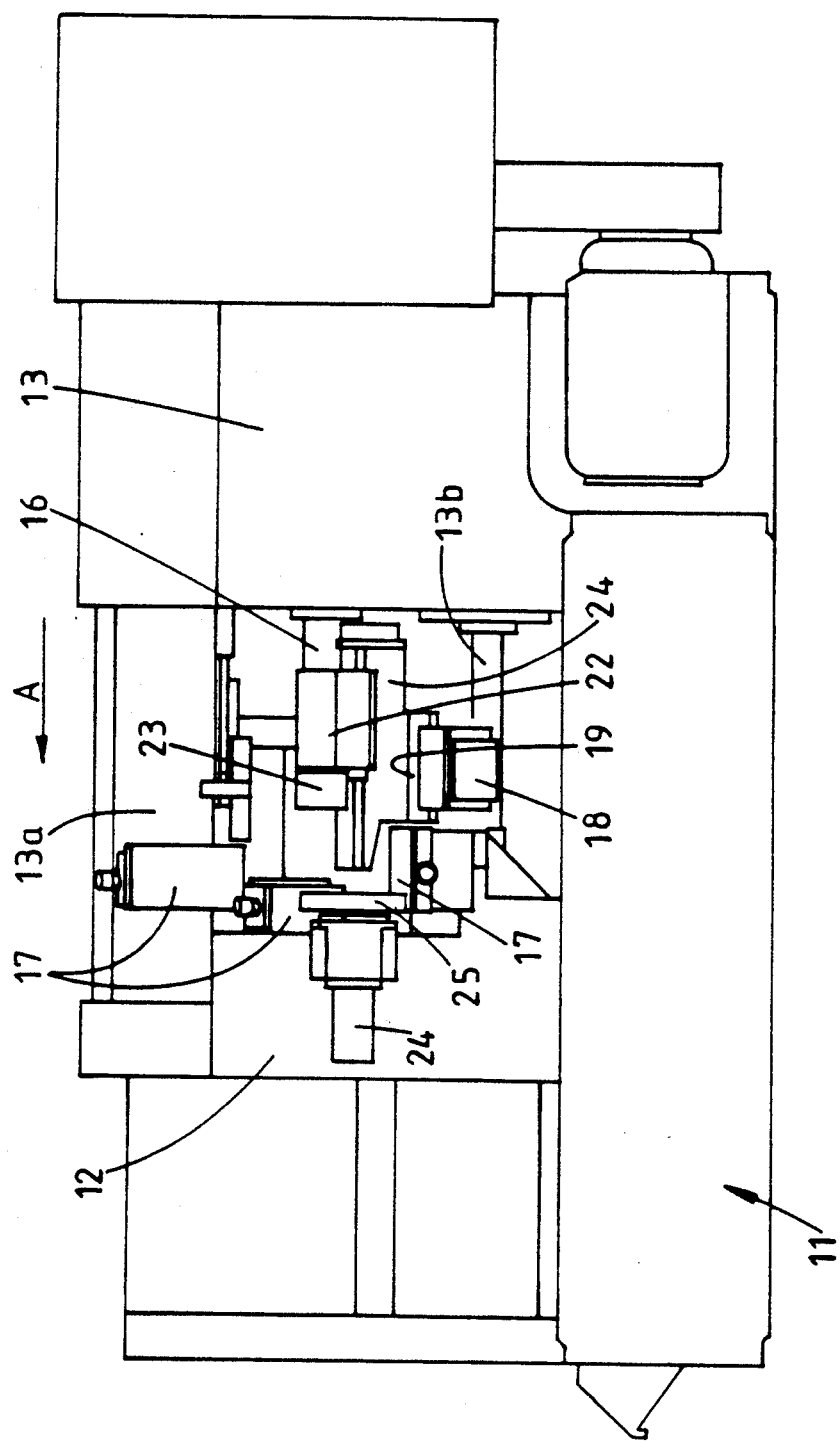

United States Patent [19]

Simon

[11] Patent Number: 4,987,807
[45] Date of Patent: Jan. 29, 1991

[54] MULTISPINDLE LATHE

[75] Inventor: Avram B. Simon, London, Great Britain

[73] Assignee: Wickman Bennett Machine Tool Co. Ltd., England

[21] Appl. No.: 489,763

[22] Filed: Feb. 27, 1990

Related U.S. Application Data

[63] Continuation of Ser. No. 214,749, Jul. 5, 1988, abandoned.

[30] Foreign Application Priority Data

Jul. 8, 1987 [GB] United Kingdom ................. 8716099
Dec. 15, 1987 [GB] United Kingdom ................. 8729235

[51] Int. Cl.$^5$ ............................................. B23Q 39/00
[52] U.S. Cl. ........................................ 82/124; 82/129
[58] Field of Search ................ 82/117, 118, 120, 121, 82/124, 129; 29/36

[56] References Cited

U.S. PATENT DOCUMENTS

| | | |
|---|---|---|
| 2,118,024 | 5/1938 | Potter et al. |
| 4,457,193 | 7/1984 | Matthey ................................. 82/3 |
| 4,612,832 | 9/1986 | Ushigoe ................................. 82/3 |
| 4,719,676 | 1/1988 | Sansone ................................. 82/3 |

FOREIGN PATENT DOCUMENTS

| | | |
|---|---|---|
| 272825 | 6/1988 | European Pat. Off. |
| 338587 | 12/1976 | Fed. Rep. of Germany |
| 2951565 | 7/1981 | Fed. Rep. of Germany ............ 82/3 |
| 2486848 | 7/1981 | France |
| 808979 | 2/1959 | United Kingdom |
| 1442598 | 7/1976 | United Kingdom .................... 82/3 |

Primary Examiner—Frederick R. Schmidt
Assistant Examiner—Blynn Shideler
Attorney, Agent, or Firm—Andrus, Sceales, Starke & Sawall

[57] ABSTRACT

A multispindle lathe comprising a rigid, stationary frame, a drum mounted for rotation on the frame, indexing means for indexing the drum relative to the frame about its axis of rotation, a plurality of driven spindles carried by the drum with their axes parallel to and spaced about the axis of rotation of the drum, each spindle being equipped to carry a workpiece, and, a plurality of tool mechanisms carried by the frame and disposed around the axis of the drum for machining workpieces carried by the main spindles, a secondary spindle facing towards said main spindles and having its axis of rotation parallel to the axes of rotation of said main spindles, said secondary spindle being equipped to grip the portion of a workpiece protruding from one of the main spindles, a two axis slide system carried by the frame of the lathe and supporting said secondary spindle whereby said secondary spindle can be moved in directions axially towards and away from, and transversely with respect to the axes of the main spindles, drive means for rotating said secondary spindle and a tool support for carrying one or more tools for machining a workpiece carried by said secondary spindle, said support being carried by the frame spaced from the axis of said drum.

8 Claims, 8 Drawing Sheets

MULTISPINDLE LATHE

This is a continuation of application Ser. No. 07/214,749, filed July 5, 1988, now abandoned.

This invention relates to multispindle lathes.

A multispindle lathe includes a plurality of parallel driven spindles, each spindle being equipped with a chuck or a collet mechanism whereby the spindle can carry a workpiece. The spindles are arranged on a rotatable drum carried by the frame of the lathe, the spindles being spaced around, and parallel to, the axis of rotation of the drum. Adjacent the drum the frame of the lathe carries a plurality of movable tool holders carrying tools for performing machining operations on the workpieces carried by the spindles, the drum being indexable to bring each workpiece in turn adjacent each tool.

After completion of machining of the region of the workpiece projecting from each chuck it is usually necessary to machine the end which was held in the chuck. It is known to perform such machining by mounting the workpieces in a separate machine but this is disadvantageous both in the requirement for an additional machine and in that the workpieces must be transferred to and mounted in the additional machine.

Attempts have been made to effect such machining without the use an additional machine by retaining the workpieces in the multispindle lathe but the complex nature of the lathe and the lack of space for the necessary tooling makes this objective difficult to achieve. U.S. Pat. specification No. 3200472 shows a multispindle lathe incorporating this feature, it being noted that the lathe of 3200472 includes a rotatable, and longitudinally movable cruciform member each limb of which carries, at its free end, a workpiece gripping mechanism. A workpiece held by one of the main spindles is gripped, during parting-off, by the mechanism at the end of one of the arms of the cruciform member and after parting-off is transferred by rotation of the cruciform member and longitudinal movement of the member about its rotational axis, to a station wherein the parted-off end of the workpiece can be axially drilled by moving the workpiece axially relative to a rotating drill bit. The arrangement illustrated in U.S. Pat. specification No. 3200472 is severely restricted in the type of operations which can be performed on the parted-off end region of the workpiece, and the positioning of the cruciform member closely adjacent the indexable drum carrying the main spindles adds greatly to the complexity to the lathe in this particular region, it being recognised that the tools and tool slides for machining the workpieces when held in the main spindles also occupy this region of the machine.

UK Pat. specification No. 1190579 shows a further approach by transferring the parted-off workpiece to a further indexing head located below the general tooling area of the multispindle lathe. In this arrangement workpieces must be turned end-to-end by an additional attachment and thus concentricity of the machining operations is difficult to maintain. Furthermore the nature of the subsequent machining operations which can be performed is very restricted and it is found that the operation of mechanisms mounted below the general tooling area of the lathe can be affected by swarf produced during machining in the general tooling area.

It is an object of the present invention to provide a multispindle lathe having the facility for performing a variety of machining operations on the parted-off end of a workpiece previously machined while held in a main spindle.

A multispindle lathe in accordance with the present invention includes a rigid, stationary frame, a drum mounted for rotation on the frame, indexing means for indexing the drum relative to the frame about its axis of rotation, a plurality of driven spindles carried by the drum with their axes parallel to and spaced about the axis of rotation of the drum, each spindle being equipped to carry a workpiece, a plurality of tool mechanisms carried by the frame and disposed around the axis of the drum for machining workpieces carried by the main spindles, a secondary spindle facing towards said main spindles and having its axis of rotation parallel to the axes of rotation of said main spindles, said secondary spindle being equipped to grip the portion of a workpiece protruding from one of the main spindles, a two axis slide system carried by the frame of the lathe and supporting said secondary spindle whereby said secondary spindle can be moved in directions axially towards and away from, and transversely with respect to the axes of the main spindles, drive means for rotating said secondary spindle, and a tool support for carrying one or more tools for machining a workpiece carried by said secondary spindle, said tool support being carried by said frame spaced from the axis of said drum.

Desirably said tool support is arranged to support a plurality of tools.

Preferably said tool support is mounted for movement relative to said frame.

Conveniently said movement of said tool support is parallel to said movement of said secondary spindle transverse to said main spindle axes.

Alternatively said movement of said tool support is at right angles to said movement of said secondary spindle transverse to said main spindle axes.

Desirably said tool support includes a rotatable turret, rotatable relative to said frame about an axis parallel to and spaced from the axis of said drum.

Desirably said tool support incorporates means for driving rotatable tools carried at one or more stations of the support.

The intended mode of operation of the multispindle lathe is that workpieces should be machined at the various index stations of the drum, and after machining in sequence in the drum index stations the secondary spindle shall accept a workpiece from the selected main spindle and shall then carry the workpiece for machining by the tools carried by said tool support. In this way the regions of the workpieces initially obscured by the holding mechanism of the main spindles will be exposed for machining while the workpiece is held in the secondary spindle.

It will be recognised however that there may be occasions when the machining operations which are required can be performed wholly by the tool mechanisms associated with the drum, and there is no need for machining to be performed on regions of the workpieces obscured by the holding mechanism on the main spindles. When the multispindle lathe is used to perform such machining then the secondary spindle and the associated tools are redundant, and the lathe is being used as a conventional multispindle lathe. It is an object of a specific embodiment of the present invention to provide a multispindle lathe wherein this disadvantage may be obviated.

Preferably the multispindle lathe further includes workpiece supply means carried by or associated with the frame of the lathe, for feeding workpieces directly to said secondary spindle, whereby a workpiece fed directly to said secondary spindle from said workpiece supply means can be subjected to machining by tools carried by said tool support at the same time that other workpieces carried by the main spindles are being machined by said tool mechanisms disposed around the axis of the drum.

It will be recognised that in a multispindle lathe as specified in the preceding paragraph the secondary spindle and its associated tools can be used to machine a workpiece supplied from the workpiece supply means while the main spindles and the associated tool mechanisms are machining workpieces of a kind which do not need to be machined by the secondary spindle and associated tools. Thus where in the above multispindle lathe without workpiece supply means the secondary spindle and its associated tools would be idle as the lathe machines workpieces not requiring operations to be performed by the secondary spindle and its associated tools, by comparison in the lathe as specified in the preceding paragraph the secondary spindle and its associated tools can simultaneously be utilized to machine workpieces independent of those being machined in the main spindles. In effect the multispindle lathe is converted into two machines sharing the frame and other ancillary equipment.

It will further be recognised that there could be situations in which the workpiece being machined in the main spindles does require machining in the secondary spindle, but by virtue of the complexity of the machining conducted at one or more of the index stations of the drum, there is a considerable delay time between the machining of consecutive main spindle workpieces in the secondary spindle. In a multispindle lathe equipped with the workpiece supply means it may be possible to use the secondary spindle to machine workpieces supplied from the workpiece supply means in the delay period between machining of "main spindle workpieces". Such organisation of work through-put is of course greatly facilitated where the functions of the multispindle lathe are computer numerically controlled.

Figure 2:
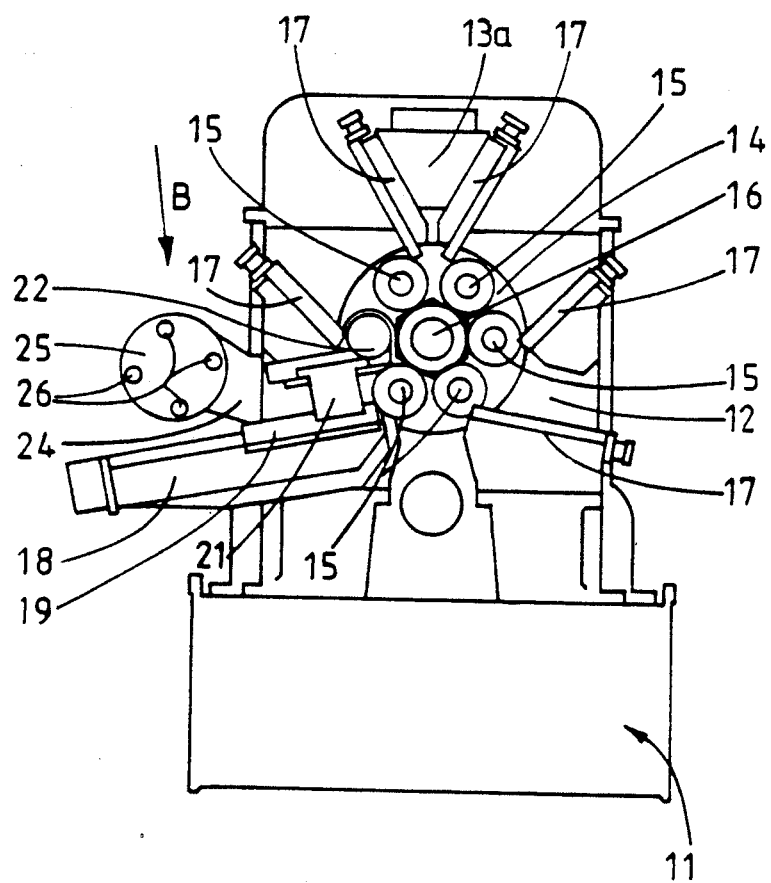
Figure 3:
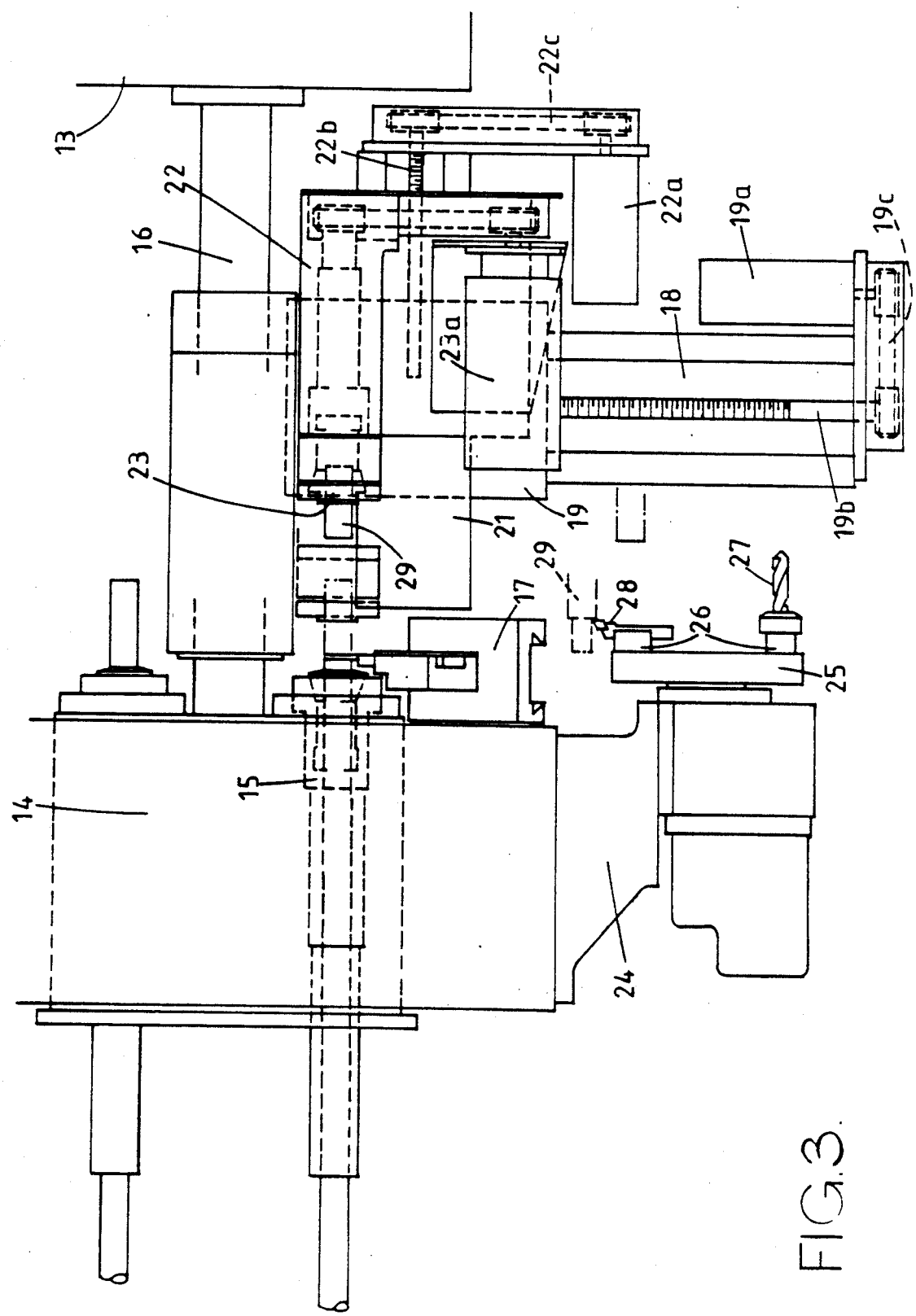
Figure 4:
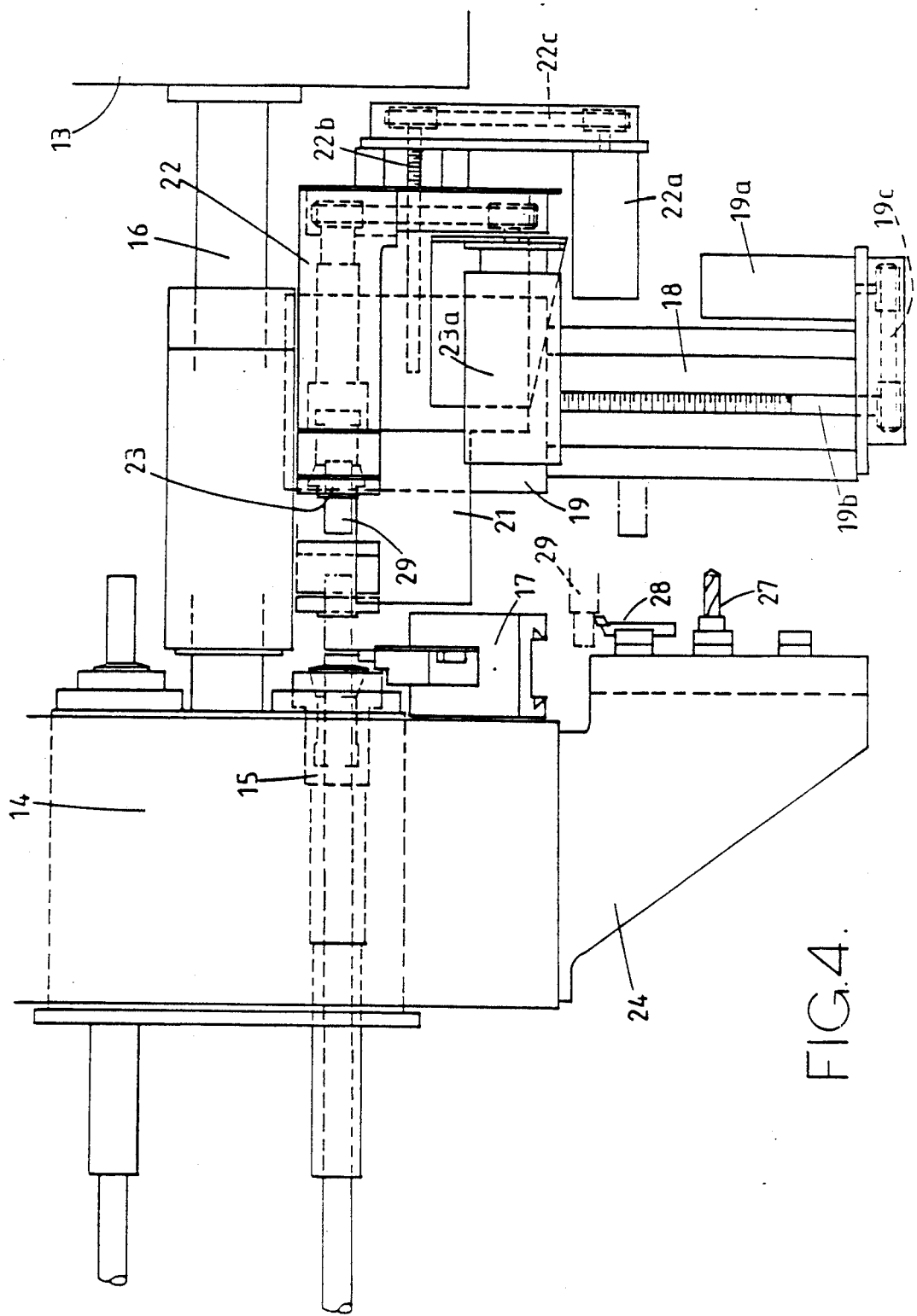
Figure 5:
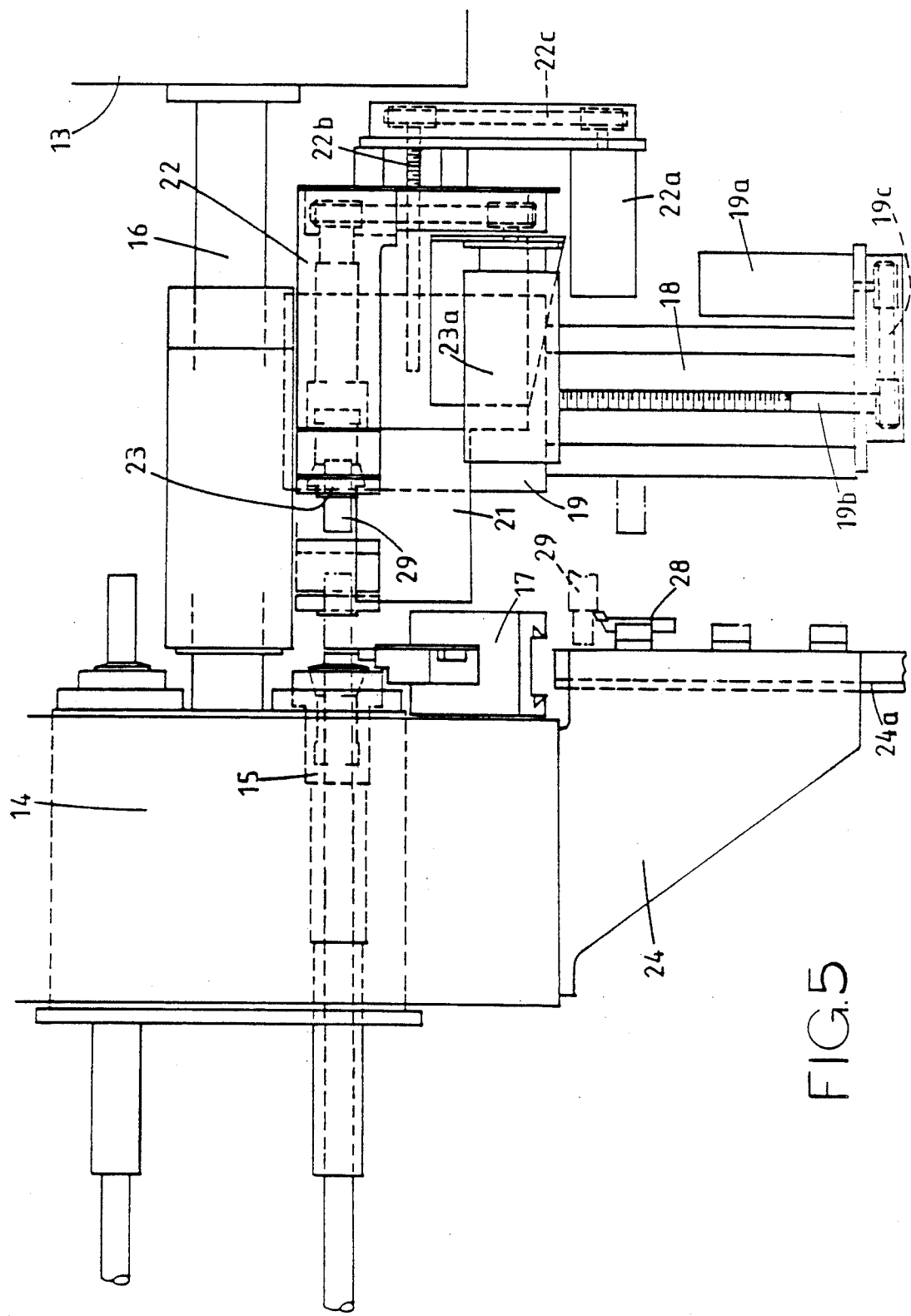
Figure 6:
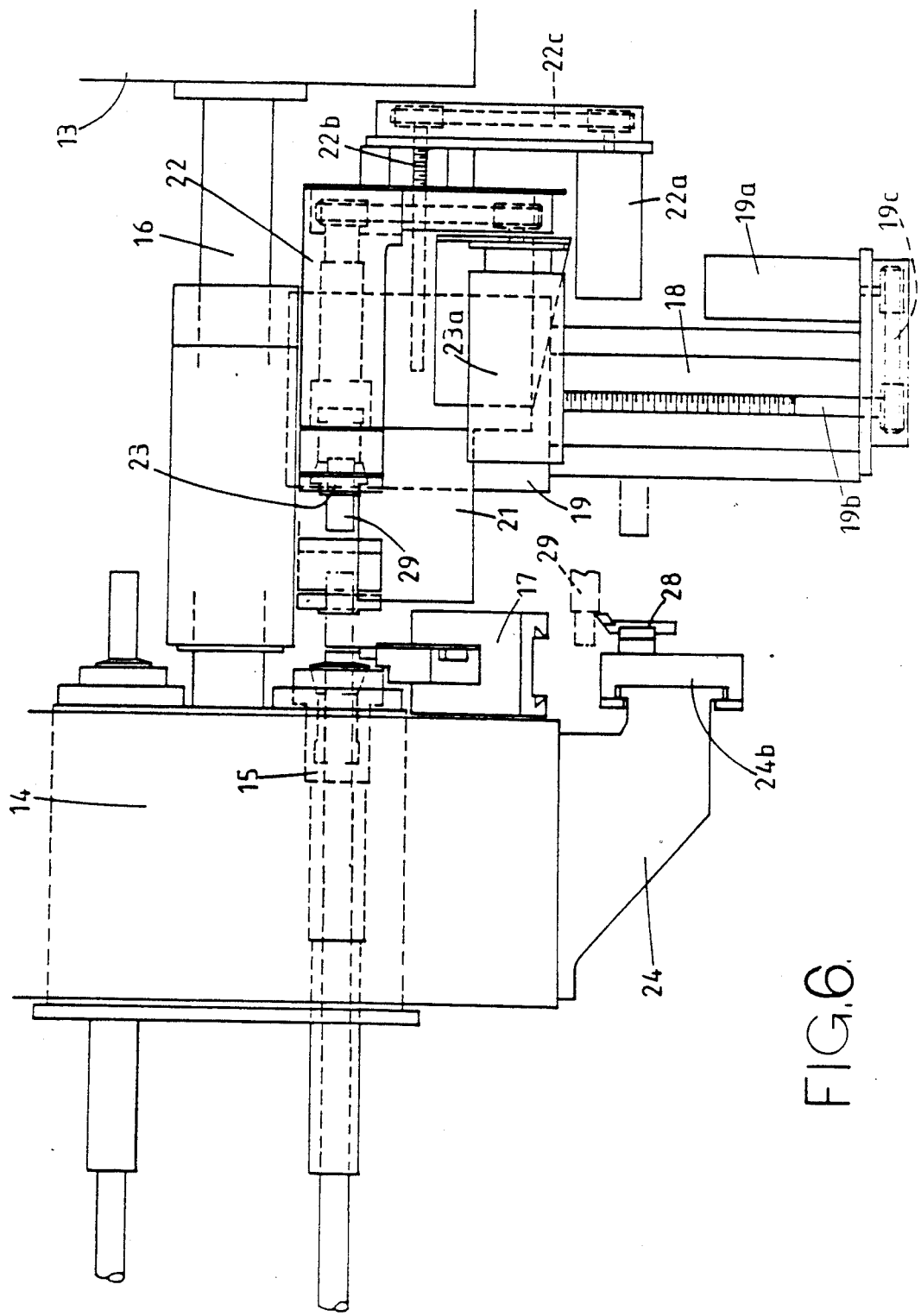
Figure 7:
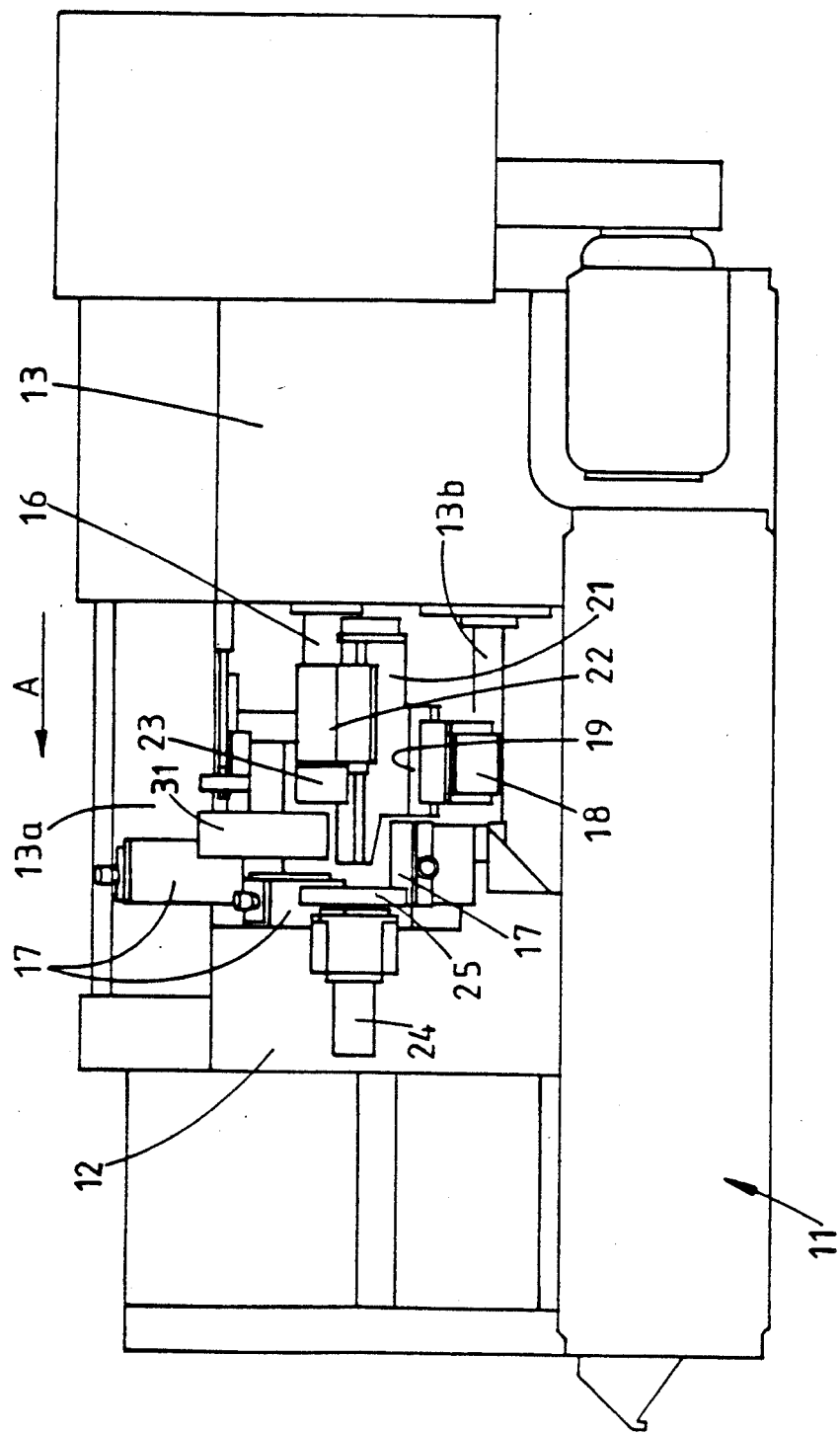
Figure 8:
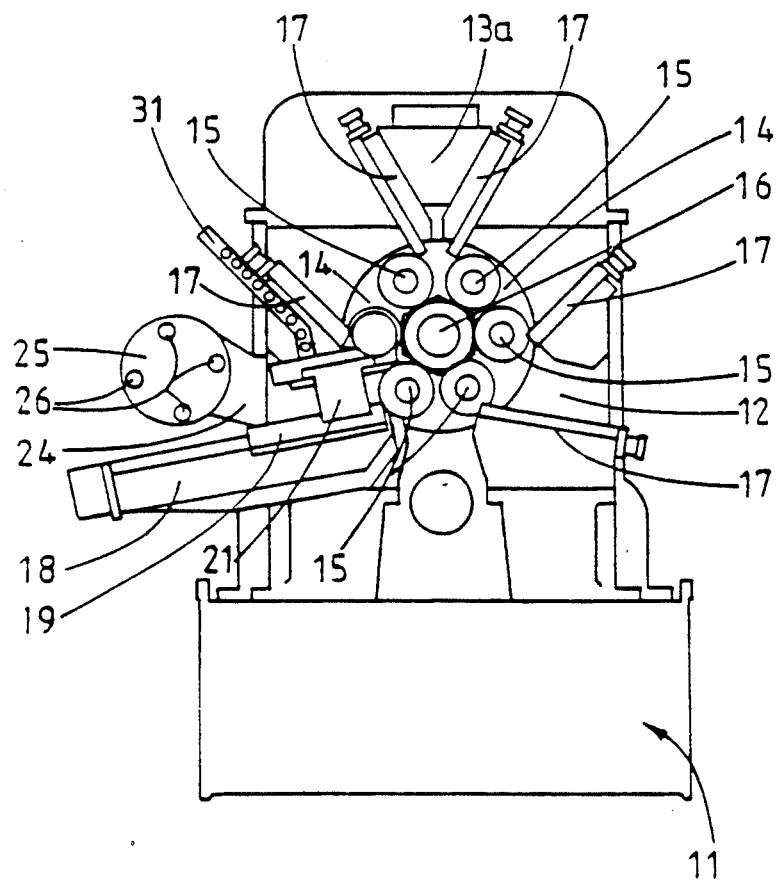

One example of the invention is illustrated in the accompanying drawings wherein;

FIG. 1 is a diagrammatic side elevational view of a multispindle lathe,

FIG. 2 is a view in the direction of arrow A in FIG. 1 with the right hand end of the machine omitted for clarity, FIG. 3 is a view in the direction of arrow B in FIG. 2 to an enlarged scale, FIGS. 4, 5 and 6 are views similar to FIG. 3 but illustrating alternative tool configurations, and FIGS. 7 and 8 are views similar to FIGS. 1 and 2 respectively and illustrating a modification thereto.

Referring first to FIGS. 1 to 3 of the drawings the lathe includes a fixed, rigid, elongate bed or frame 11 incorporating, adjacent one end, a drum housing 12, and incorporating, adjacent the opposite end, a drive housing 13. The drum housing 12 rotatably supports a spindle carrying drum 14 the axis of rotation of the drum 14 being parallel to the length of the frame 11. Equiangularly spaced about the axis of rotation of the drum 14 are six main spindles 15 positioned with their axes parallel to the axis of rotation of the drum. Each spindle 15 is supported for rotation by the drum and protrudes therefrom to receive a chuck, or a collet mechanism for gripping and carrying a workpiece to be machined. The main drive motors and gearboxes of the lathe are received within the housing 13, and drive to the spindles 15, to rotate the spindles 15 in the drum 14, is transmitted from the housing 13 to the spindles by way of a centrally disposed main drive shaft housed within a tube 16. A hollow housing part 13a interconnects the housing 13 and the housing 12 and a drive transmission shaft for actuating the indexing mechanism of the drum 14 extends within a tube 13b extending from the housing 13.

Secured to the frame of the lathe and disposed around the drum 14 are six fixed slideways, four being secured to the housing 12 and two being secured to the housing 13a. The six slideways each carry the reference numeral 17 in the drawings, and each extends generally towards the drum 14. Although not shown in the drawings each slideway slidably supports a tool holder carrying a cutting tool, and each tool can be moved along its slideway to machine the workpiece carried by a respective spindle 15. The indexing mechanism of the drum 14 is such that when the drum is indexed a workpiece carried by a spindle moves from the machining region of one tool to the machining region of the next circumferentially adjacent tool. Thus six separate machining stages can be performed on each workpiece while the workpiece is carried by its respective spindle 15, each machining stage taking place in a respective indexed position of the drum 14. Control of the speed and direction of rotation of the spindles, indexing of the drum 14, and movement of the tool holders on the slideways 17 is conveniently, but not essentially, effected by a numerical control system of the lathe.

So far described the multispindle lathe is generally conventional. However, the lathe shown in the drawings departs from the generally recognised multispindle concept in that a further fixed slideway 18, carried by the frame, extends between the housings 12, 13 generally towards the drum 14, the slideway 18 slidably supporting a carriage 19. Secured on the carriage 19 is a transverse slideway 21 the slideway 21 extending at right angles to the slideway 18, and thus being parallel with the axes of the spindles 15. Slidable on the slideway 21 is a spindle housing 22 supporting a rotatable spindle 23 for rotation about an axis parallel to the axes of the spindles 15. At its end presented towards the spindles 15, the spindle 23 is equipped to grip a workpiece, either by being provided with a collet mechansim, or a chuck. A drive mechanism for the spindle 23 is carried by the spindle housing 22 and the housing 22 can be driven along the slideway 21, the carriage 19 being drivable along the slideway 18. Thus the spindle 23 is supported between the housings 12, 13 by way of a two axis compound slide system.

The positioning of the slideway 18 in relation to the drum 14 is such that by movement of the two axis compound slide system the spindle 23 can be placed in axial alignment with one of the index positions of the spindles 15. Thus the spindle 23 can be positioned coaxial with a spindle 15. The index position with which the spindle 23 can be coaxial is that index position which is chosen to be last in the sequence of movements of the drum 14. Thus a workpiece which has passed through the preceding five index positions, and of course may have been subjected to one or more machining operations in each of those positions, can be transferred to the spindle 23. This procedure, in more detail, is as follows.

Let us assume that the sixth index position of the drum 14 is a position in which a workpiece, machined in some or all of the five previous index positions, is to be parted-off from its bar-stock carried in the respective spindle 15. Thus the cutting tool movable on the slideway 17 associated with the sixth index position will be a parting-off tool. With the workpiece to be parted-off in the sixth index position the spindle housing 22 and spindle 23 are positioned by movement of the carriage 19 on the slideway 18 so that the spindle 23 is coaxial with the workpiece. At the same time the speed of rotation of the spindle 15 is being monitored and the monitored speed of the spindle 15 is used to control the speed of the drive motor of the spindle 23. When the speed of the drive motor of the spindle 23 matches the speed of rotation of the spindle 15 the spindle 23 is then moved axially to engage the workpiece by movement of the spindle housing 22 on the slideway.

The gripping mechanism of the spindle 23 is then operated to grip the workpiece so that at this time the workpiece is gripped both in the spindle 15 and the spindle 23, such that the workpiece is being driven both by the spindle 23 and the spindle 15. The parting-off tool is operated to part the workpiece from the bar-stock in the spindle 15. Thus the workpiece is now carried solely by the spindle 23 and its parted-off end protrudes from the spindle 23 for subsequent machining as will be described below.

In a further alternative mode of operation the workpiece is a previously cut-to-length blank, forging, or, casting and so does not need to be parted-off from bar-stock in the spindle 15. In this mode of operation the machining operation performed at the sixth index station will be a workpiece shaping operation rather than a parting-off operation, and at the conclusion of this operation the rotating workpiece will be gripped by the synchronised rotating spindle 23 and the gripping mechanism of the spindle 15 will be released whereupon as the spindle 23 is withdrawn along the slideway 21 the workpiece will be withdrawn from the spindle 15 thus exposing the previously gripped end of the blank for machining operations.

Protruding laterally outwardly from the housing 12 adjacent the slideway 18 is a tool support structure 24 supporting, at its free end, a rotatable tool turret 25. The axis of rotation of the tool turret 25 is parallel to the axis of rotation of the drum 14 and at the face of the turret 25 presented towards the housing 13 are four or more equiangularly spaced tool locations 26. FIG. 3 shows the turret 25 carrying, at a pair of diametrically opposed locations 26, two different forms of cutting tool. In one location there is a shown an axialy extending drill-bit 27, and in the opposite location 26 there is shown a transversly extending tool holder carrying a cutting insert 28.

After picking up the workpiece (shown at 29 in FIG. 3) the spindle 23 is withdrawn along the slideways 21 and 18 so that it can be aligned with a chosen one of the tools of the turret 25. Thereafter, by rotation of the turret and appropriate movement of the workpiece 29 by virtue of the slideways 18 and 21 the end of the workpiece 29 protruding from the spindle 23 can be subjected to a series of machining operations by the tools carried on the turret 25. It will be noted that in FIG. 3 the tools carried by the turret 25 are stationary tools, and rely for the cutting action upon rotation and axial movement of the workpiece relative to the tool. It is to be understood however that if desired the turret 25 can be adapted to receive driven tools, a convenient example of which would be a transversely extending drill bit for cross-drilling the workpiece 29. During such an operation the spindle 23 would be stationary, having been accurately angularly positioned to locate the workpiece 29 in the correct circumferential location for the cross-drilling operation, the motor driving the cross-drilling drill-bit would be energised, and the carriage 19 would be withdrawn along the slideway 18 to engage the workpiece 29 with the rotating drill bit.

When all of the desired machining operations on both ends of the workpiece have been performed the spindle housing 22 is moved by virtue of the compound slide system to position the workpiece 23 at an ejection location wherein the gripping mechanism of the spindle 23 is released, and the workpiece is ejected into a receiving system.

In FIG. 3 it can be seen that the slideway 18 supports a drive motor 19a which can drive a leadscrew 19b through a toothed belt transmission 19c. The leadscrew 19b can be rotated clockwise or anti-clockwise and is coupled to a nut carried by the carriage 19. Thus operation of the motor 19a moves the carriage 19 along the slideway 18. Similarly, the slideway 21 supports an electric motor 22a driving a leadscrew 22b through a toothed belt transmission 22c. The leadscrew 22b cooperates with a nut carried by the housing 22 so that the housing 22 can be moved back and forwards along the slideway 21. The drive motor for the spindle 23 is shown at 23a and this drives the spindle 23 through a toothed belt coupling. It will be recognised that control of the motors 19a, 22a, 23a, and the motor which indexes the turret 25 and the motor of a driven tool on the turret 25 if such is provided, is also effected by the numerical control system of the lathe. Thus the lathe can be pre-programmed to perform a complete sequence of machining operations involving both ends of the workpiece. It will be recognised that the use of a driven spindle 23 carried by a two axis compound slide system operating in conjunction with a tool turret permits a very large degree of flexibility in the nature of the machining operations, and the sequence thereof.

In the event that the time needed to perform the sequence of machining operations using the two-axis compound slide system and the associated turret exceeds the normal time cycle of the remainder of the lathe then each index movement of the drum 14 will be delayed to permit completion of the machining at the turret.

Although the use of a rotatable tool turret 25 in association with the spindle 23 is an advantageous arrangement there may be applications which do not necessitate such a comprehensive lathe construction. Thus as shown in FIG. 4 the tool support 24 may instead carry an array of fixed tools 27, 28, movement of the spindle 23 by virtue of the slideway 18 being used to select the appropriate tool for machining the workpiece. FIG. 5 illustrates a modification of FIG. 4 in which a slideway 24a is incorporated to permit movement of the array of tools relative to the support 24, the slideway 24a being parallel to the slideway 18 of the spindle 24. In the modification shown in FIG. 6 the slideway 24a is replaced by a slideway 24b extending at right angles to the slideway 18, the array of tools conveniently extending parallel to the slideway 24b. There may be drive motors for driving the lead screws of the slideways 24a, 24b and such motors will, where appropriate, be under the control of the numerical control system of the lathe. It would be possible, if desired, to provide a rotatable tool turret, equivalent to the turret 25, on the slideways 24a or 24b.

The modification of the lathe illustrated in FIGS. 7 and 8 is a modification of the lathe of FIGS. 1, 2 and 3. It is to be recognised that the modification can also be applied to lathes as described with reference to FIGS. 4, 5 and 6.

The intended mode of operation of the lathe described with reference to FIGS. 1 to 3 is that after a workpiece has been machined at successive index stations of the drum it shall be transferred to the spindle 23 so that regions of the workpiece obscured by the main spindles can be machined by the tools 26 carried by the turret 25 while the workpiece is carried by the spindle 23.

It will be recognised however that where a workpiece is such that it does not need to be machined while held in the spindle 23 then at the last index station of the drum 14 the workpieces will be ejected, and throughout the whole operation the spindle 23 and its associated turret 25 will be idle.

The multispindle lathe shown in FIGS. 7 and 8 differs from that shown in FIGS. 1 and 2 by the provision of workpiece supply means for feeding workpieces directly to the spindle 23. In the example of the invention illustrated in FIGS. 7 and 8 the workpiece supply means is in the form of a chute 31 which stores workpieces with their axes parallel to the axis of rotation of the spindle, and supplies them one at a time to a pick-up point located within the range of movement of the spindle 23 on the two axis compound slide system.

It will be recognised therefore that while a first workpiece type is being machined by the tools associated with the main spindles 15, a second workpiece type can be machined completely independently by the spindle 23 and the tools carried by the turret 25, the second workpiece being supplied directly to the spindle 23 from the workpiece supply means 31, rather than being supplied to the spindle 23 from one of the spindles 15. In effect two separate lathes, one of which is a multispindle lathe of conventional form, are being operated simultaneously, but independently of one another except in so far as the two lathes share the same frame, and other ancillary equipment. As will be appreciated the use of computer numerical control (CNC) greatly facilitates such flexibility of operation, since simply by altering the programming the spindle 23 can pick up workpieces from the supply 31, or from a selected spindle 15 so that the spindle 23 and associated turret 25 can be used either in conjunction with the spindles 15, or separately therefrom.

It is to be understood that the workpiece supply means 31 can take a wide variety of different forms. Thus the chute 31 can if desired be hand loaded, or can be loaded from a bowl feeder or the like. Alternatively a bowl feed could supply some other form of transfer mechanism for delivering workpieces singly from the feeder to the region of the spindle 23 with the workpiece axis parallel to that of the spindle 23. As a still further alternative a robot device, for example a multi-wristed robot arm could be used to supply workpieces from a remote location to the spindle 23, and irrespective of the nature of the supply means 31 it will be recognised that the supply means 31 can be carried by the frame 11 of the multispindle lathe, or can be a free-standing unit associated with the frame.

In the foregoing description relating to FIGS. 7 and 8 it is contemplated that the lathe may be used with the spindle 23 receiving machined workpieces in turn from the spindles 15, or may be used independently of the spindles 15, receiving workpieces from the supply 31. There is another conceivable mode of operation wherein the spindle 23 receives workpieces from the supply means 31 between consecutive workpieces received from the spindles 15. Thus it may be that workpieces from the supply means 31 require a relatively short machining time whereas workpieces being machined at the various index stations of the drum 14 have a relatively long machining time. It would follow therefore that if the spindle 23 were to receive workpieces only from the spindles 15 then there would be a substantial delay between operating on consecutive workpieces from the spindles 15, and in this delay period it would be possible for the spindle 23 to receive, and to rotate for machining, a workpiece from the supply means 31. Naturally such a mode of operation is greatly facilitated by computer numerical control of the various functions of the multispindle lathe.

I claim:

1. In an improved multi-spindle lathe, the combination comprising:
   (a) a rigid stationary frame having a bed and spaced apart first and second housings fixed to and upstanding from the bed, said first and second housings defining a workspace therebetween,
   (b) an indexable drum mounted for rotation on said first housing of said frame,
   (c) indexing means for indexing said drum relative to said first housing about the axis of rotation of said drum,
   (d) a plurality of driven main spindles carried by said drum and with said main spindles having axes of rotation disposed parallel to and spaced about said drum axis,
   (e) each said main spindle being positioned to carry a workpiece within said workspace,
   (f) a plurality of tool mechanisms carried by said frame and disposed about said drum axis for machining workpieces carried by said main spindles,
   (g) said multispindle lathe further including a secondary spindle facing towards said main spindles and with said secondary spindle having an axis of rotation positioned parallel to said rotational axes of said main spindles,
   (h) said secondary spindle being equipped to grip a portion of a workpiece protruding from one of said main spindles,
   (i) and drive means for rotating said secondary spindle,
   (j) the improvement comprising:
      (1) a two-axis slide system including a fixed slideway and a movable slideway carried by said frame with said fixed slideway thereof extending between said first and second housings and with said slide system supporting said secondary spindle so that said secondary spindle can be moved in directions axially towards and away from as well as transversely with respect to said axes of said main spindles,
      (2) and a tool support for carrying one or more tools for machining only a workpiece carried by said secondary spindle,
      (3) said tool support being carried by said first housing outside of said workspace.

2. The combination of claim 1 wherein the fixed slideway of said slide system is positioned substantially outside the workspace and said secondary spindle is supported for transverse movement on said fixed slideway into and out of the workspace.

3. A lathe as claimed in claim 1 wherein said tool support is mounted for movement relative to said frame.

4. A lathe as claimed in claim 3 wherein said movement of said tool support is movement in a direction parallel to said movement of said secondary spindle transverse to said main spindle axes.

5. A lathe as claimed in claim 3 wherein said movement of said tool support is movement in a direction at right angles to said movement of said secondary spindle transverse to said main spindle axes.

6. A lathe as claimed in claim 1 wherein said tool support includes a rotatable turret, said turret being rotatable relative to said frame about an axis parallel to and spaced from the axis of said drum.

7. The combination of claim 1 wherein the construction is such that a workpiece held in said secondary spindle can be machined by tools carried by said tool support either separately from or simultaneously with the machining of workpieces held in said main spindles for machining by said tool mechanisms.

8. A multispindle lathe comprising, in combination:
   (a) a rigid stationary frame having a first end and having a second end spaced from said first end so as to define a workspace between said first and second ends,
   (b) a drum mounted for rotation on one of said ends of said frame,
   (c) indexing means for indexing said drum relative to said frame about the axis of rotation of said drum,
   (d) a plurality of driven main spindles carried by said drum and with said main spindles having axes of rotation disposed parallel to and spaced about said drum axis,
   (e) each said main spindle being positioned to carry a workpiece within said workspace,
   (f) a plurality of tool mechanisms carried by said frame and disposed about said drum axis for machining workpieces carried by said main spindles,
   (g) said multispindle lathe further including a secondary spindle facing towards said main spindles and with said secondary spindle having an axis of rotation positioned parallel to said rotational axes of said main spindles,
   (h) said secondary spindle being equipped to grip a portion of a workpiece protruding from one of said main spindles,
   (i) a two-axis slide system carried by said frame and with said slide system supporting said secondary spindle so that said secondary spindle can be moved in directions axially towards and away from as well as transversely with respect to said axes of said main spindles,
   (j) drive means for rotating said secondary spindle,
   (k) a tool support for carrying one or more tools for machining a workpiece carried by said secondary spindle,
   (l) said tool support being carried by the said one of said ends of said frame and being spaced from the said axis of said drum,
   (m) and workpiece supply means carried by or associated with said frame of said lathe,
   (n) said workpiece supply means comprising means for feeding workpieces directly to said secondary spindle so that a workpiece fed directly to said secondary spindle from said workpiece supply means can be subjected to machining by tools carried by said tool support at the same time that other workpieces carried by said main spindles are being machined by said tool mechanisms disposed about the axis of said drum.

* * * * *